(12) United States Patent
Mizuoka et al.

(10) Patent No.: US 10,306,312 B2
(45) Date of Patent: May 28, 2019

(54) DATA CONNECTION DEVICE, METHOD AND STORAGE MEDIUM

(71) Applicant: KABUSHIKI KAISHA TOSHIBA, Minato-ku, Tokyo (JP)

(72) Inventors: Yoshiaki Mizuoka, Kamakura Kanagawa (JP); Kouta Nakata, Tokyo (JP); Ryohei Orihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 15/691,063

(22) Filed: Aug. 30, 2017

(65) Prior Publication Data

US 2018/0255352 A1 Sep. 6, 2018

(30) Foreign Application Priority Data

Mar. 3, 2017 (JP) .................. 2017-040672

(51) Int. Cl.
*H04H 60/33* (2008.01)
*H04H 60/32* (2008.01)
*H04N 7/173* (2011.01)
*H04N 7/16* (2011.01)
*H04N 21/442* (2011.01)
(Continued)

(52) U.S. Cl.
CPC ....... *H04N 21/44222* (2013.01); *H04L 67/22* (2013.01); *H04N 21/25883* (2013.01); *G06Q 30/0255* (2013.01)

(58) Field of Classification Search
CPC ......... H04N 21/43635; H04N 21/4126; H04N 21/41407; H04N 21/42204; H04N 21/4312; H04N 21/435; H04N 21/43615; H04N 21/43637; H04N 21/44204; H04N 21/443; H04N 21/47217; H04N 21/482; H04N 5/4403; H04N 5/44543; H04N 7/015; G06F 1/1643; G06F 3/016; G06F 3/0416; G06F 3/04817; G06F 3/0482; G06F 3/0484; G06F 3/04847; G06F 3/04883; G06F 3/04886;
(Continued)

(56) References Cited

U.S. PATENT DOCUMENTS

| 2014/0280237 A1* | 9/2014 | Salkola | .................. G06Q 50/01 707/749 |
| 2015/0163530 A1* | 6/2015 | Bayer | .............. H04N 21/25891 725/9 |
| 2016/0249083 A1* | 8/2016 | Okimoto | .............. H04N 21/252 |

FOREIGN PATENT DOCUMENTS

| JP | H 10-187734 A | 7/1998 |
| JP | 3718936 B2 | 11/2005 |

(Continued)

*Primary Examiner* — Kyu Chae
(74) *Attorney, Agent, or Firm* — Knobbe, Martens, Olson & Bear, LLP (57) ABSTRACT

According to one embodiment, a data connection device includes a first log storage, a second log storage, and a hardware processor. The first log storage is configured to store a plurality of first logs indicating a first behavior of a first user. The second log storage is configured to store a plurality of second logs which are independent of the plurality of first logs and indicate a second behavior of a second user. The hardware processor is configured to acquire a set of first logs indicating a specific first behavior, from the plurality of first logs, acquire a set of second logs having a feature in common with the set of first logs, and connect the set of first logs with the set of second logs.

8 Claims, 5 Drawing Sheets

(51) Int. Cl.
  *H04L 29/08* (2006.01)
  *H04N 21/258* (2011.01)
  *G06Q 30/02* (2012.01)

(58) Field of Classification Search
  CPC ...... G06F 3/14; G08C 17/02; H04M 1/72533; H05K 999/99
  See application file for complete search history.

(56) References Cited

FOREIGN PATENT DOCUMENTS

JP   2010-160642 A    7/2010
JP   5084751 B2      11/2012

* cited by examiner

DATA CONNECTION DEVICE, METHOD AND STORAGE MEDIUM

CROSS-REFERENCE TO RELATED APPLICATIONS

This application is based upon and claims the benefit of priority from Japanese Patent Application No. 2017-040672, filed. Mar. 3, 2017, the entire contents of which are incorporated herein by reference.

FIELD

Embodiments described herein relate generally to a data connection device, a method and a storage medium.

BACKGROUND

In recent years, it is known that a viewing log indicating that a viewer has viewed a program (content) at a video viewing apparatus (which will be hereinafter written as a viewing apparatus) such as TV connected with a network such as the Internet, for example, is acquired from the viewing apparatus.

An analysis result obtained by analyzing such a viewing log can be utilized for improving the quality of service such as program production and advertisement development, for example.

Sometimes a purchase log indicating that a purchaser (a consumer) has purchased a product or the like is acquired as a separate log independent of a viewing log described above. An analysis result obtained by analyzing such a purchase log can be utilized for marketing or the like, for example.

Although a viewing log and a purchase log are useful information as described above, these two logs are independent logs and therefore cannot be utilized in a connected manner.

If these two logs can be utilized in a connected manner, it becomes possible to obtain information which cannot be obtained from a single log.

DETAILED DESCRIPTION

In general, according to one embodiment, a data connection device includes a first log storage, a second log storage and a hardware processor. The first log storage is configured to store a plurality of first logs indicating a first behavior of a first user. The second log storage is configured to store a plurality of second logs. The plurality of second logs are independent of the plurality of first logs and indicate a second behavior of a second user. The hardware processor is configured to acquire a set of first logs indicating a specific first behavior, the set of first logs from the plurality of the first logs, acquire a set of second logs having a feature in common with the set of first logs, and connect the set of first logs with the set of second logs.

Various embodiments will be described hereinafter with reference to the accompanying drawings.

Figure 1:
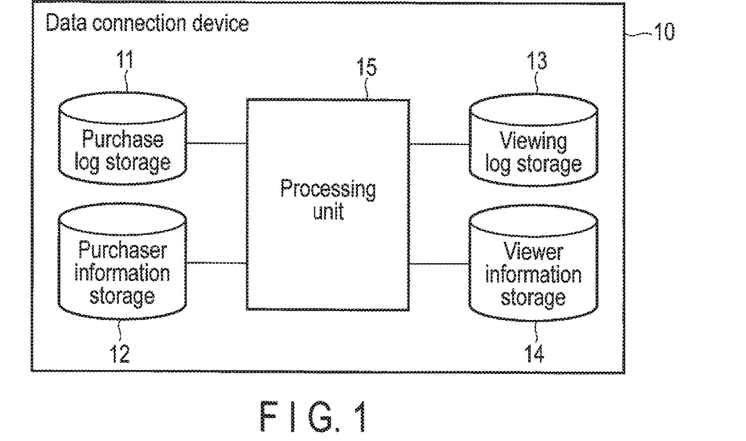
FIG. 1 is a block diagram illustrating an example of the structure of a data connection device according to an embodiment.

FIG. 1 is a block diagram illustrating an example of the structure of a data connection device according to this embodiment. The data connection device according to this embodiment is utilized to connect a first log indicating (history of) first behavior of a first user and a second log, which is independent of the first log and indicates (history of) second behavior of a second user, with each other so as to obtain information which cannot be obtained from each of the first log and the second log. It is to be noted that independent logs in this embodiment mean that the logs are independent of each other because acquisition methods of record of history are different, items to be the subject of history are different, the structures of database which record history are different, or the like even when the logs are history of behavior of the same person, for example.

In the following description, it is to be assumed that a first log indicating first behavior is a purchase log (buying log) which indicates behavior of purchasing a product by at least one of a first user, for example. On the other hand, it is to be assumed that a second log indicating second behavior is a viewing log which indicates behavior of viewing a program by at least one of a second user at a video viewing apparatus (a viewing apparatus in the following description) such as TV with which it is possible to view a program, for example.

In such a case, a data connection device 10 includes a purchase log storage 11, a purchaser information storage 12, a viewing log storage 13, a viewer information storage 14 and a processing unit 15 as illustrated in FIG. 1.

In this embodiment, the purchase log storage 11, the purchaser information storage 12, the viewing log storage 13 and the viewer information storage 14 are implemented using a memory or a storage device such as HDD (Hard Disk Drive) and SSD (Solid State Drive), for example, provided in the data connection device 10. Moreover, the processing unit 15 is implemented by a computer provided in the data connection device 10 configured to execute a program stored in a memory, for example. The processing unit 15 includes a hardware processor or the like.

The purchase log storage 11 stores a purchase log described above. A purchase log indicates history of behavior of presenting a point card and purchasing a product at a store by a user (which will be hereinafter written as a purchaser) who owes the point card, for example. It is to be assumed that a number of purchase logs collected from each of (terminals located in) a plurality of stores which can collect a purchase log are preliminarily stored in the purchase log storage 11.

Information relating to a purchaser who owes a point card to be presented at the time of purchasing a product (which will be hereinafter written as purchaser information) is preliminarily stored in the purchaser information storage 12. It is to be noted that purchaser information is registered in the purchaser information storage 12 by a purchaser when the purchaser acquires a point card, for example.

The viewing log storage 13 stores a viewing log described above. A viewing log indicates history of behavior of viewing a program at a viewing apparatus by a user (which will be hereinafter written as a viewer) who uses the viewing apparatus as described above. It is to be assumed that a number of viewing logs collected from each of a plurality of viewing apparatuses which can collect a viewing log are preliminarily stored in the viewing log storage 13.

Information relating to a viewer who views a program at a viewing apparatus which collects a viewing log (which will be hereinafter written as viewer information) is preliminarily stored in the viewer information storage 14. It is to be assumed that viewer information is registered in the viewer information storage 14 by a viewer when the viewer starts using the viewing apparatus, for example.

Details of (the data structure of) a purchase log stored in the purchase log storage 11, purchaser information stored in the purchaser information storage 12, a viewing log stored in the viewing log storage 13, and viewer information stored in the viewer information storage 14 will be described later.

The processing unit 15 refers to the purchase log storage 11, the purchaser information storage 12, the viewing log storage 13 and the viewer information storage 14, and executes processing for connecting a set of purchase logs (a set of first logs) stored in the purchase log storage 11 and a set of viewing logs (a set of second logs) stored in the viewing log storage 13 with each other. Details of the processing unit 15 will be described later.

Figure 2:
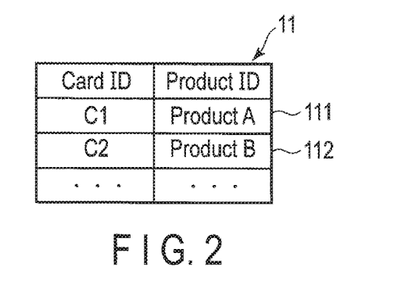
FIG. 2 is a view illustrating an example of the data structure of a purchase log stored in a purchase log storage.

FIG. 2 illustrates an example of the data structure of a purchase log stored in the purchase log storage 11 illustrated in FIG. 1. As illustrated in FIG. 2, a purchase log stored in the purchase log storage 11 includes a product ID in association with a card ID.

A card ID is identification information to be used for identifying a point card owed by a purchaser. A product ID is identification information to be used for identifying a product which has been purchased by a purchaser who owes a point card identified by a card ID associated with the product ID.

In the example illustrated in FIG. 2, the purchase log storage 11 stores a plurality of purchase logs including purchase logs 111 and 112.

Specifically, the purchase log 111 includes a product ID "Product A" in association with a card ID "C1". This purchase log 111 indicates that a purchaser who owes a point card identified by a card ID "C1" has purchased a product identified by a product ID "Product A".

Moreover, the purchase log 112 includes a product ID "Product B" in association with a card ID "C2". This purchase log 112 indicates that a purchaser who owes a point card identified by a card ID "C2" has purchased a product identified by a product ID "Product B".

It is to be noted that the purchase log 111 is stored in the purchase log storage 11 in response to transmission of the card ID "C1" and the product ID "Product A" from a terminal installed in a store when a purchaser who owes a point card identified by the card ID "C1" purchases a product identified by the product ID "Product A" in the store, for example. The same applies to the purchase log 112.

Although detailed description is omitted here, history of purchase of a product by all purchasers who owe a point card is stored as a purchase log in the purchase log storage 11 in addition to the purchase logs 111 and 112.

A purchase log may also include a store ID to be used for identifying a store where a product identified by a product ID is purchased, or other information, though omitted in FIG. 2.

Figure 3:
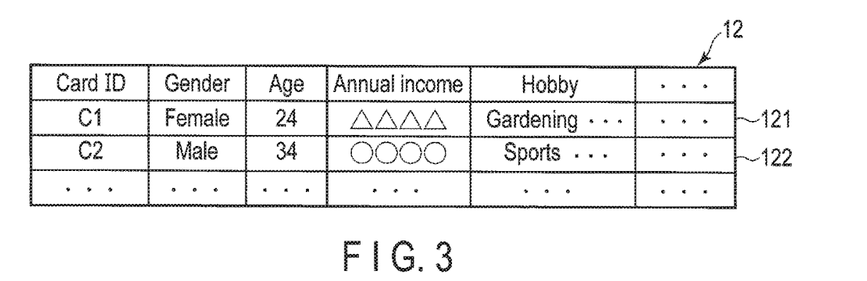
FIG. 3 is a view illustrating an example of the data structure of purchaser information stored in a purchaser information storage.

FIG. 3 illustrates an example of the data structure of purchaser information stored in the purchaser information storage 12 illustrated in FIG. 1. Purchaser information stored in the purchaser information storage 12 includes a plurality of types of attribute information such as gender, age, annual income and hobby, for example, in association with a card ID.

A card ID is identification information to be used for identifying a point card owed by a purchaser. Gender indicates the gender of a purchaser who owes a point card identified by a card ID associated with the gender. Age indicates the age of a purchaser who owes a point card identified by a card ID associated with the age.

Annual income indicates the annual income of a purchaser who owes a point card identified by a card. ID associated with the annual income. Hobby indicates the hobby of a purchaser who owes a point card identified by a card ID associated with the hobby.

In the example illustrated in FIG. 3, the purchaser information storage 12 stores a plurality of pieces of purchaser information including purchaser information 121 and purchaser information 122.

Specifically, the purchaser information 121 includes gender "Female", age "24", annular income "ΔΔΔΔ" and hobby "Gardening, . . . " in association with a card ID "C1". This purchaser information 121 indicates that the gender of a purchaser who owes a point card identified by a card ID "C1" is female, the age of the purchaser is 24 years old, the annual income of the purchaser is ΔΔΔΔ, and the hobby of the purchaser is gardening and the like.

Moreover, the purchaser information 122 includes gender "Male", age "34", annual income "○○○○" and hobby "Sports, . . . " in association with a card ID "C2". This purchaser information 122 indicates that the gender of a purchaser who owes a point card identified by a card ID "C2" is male, the age of the purchaser is 34 years old, the annual income of the purchaser is ○○○○, and the hobby of the purchaser is sports and the like.

Although detailed description is omitted here, the purchaser information storage 12 stores purchaser information relating to all purchasers who owe a point card in addition to the purchaser information 121 and 122.

Although (gender, age, annual income, hobby and the like included in purchaser information is registered in the purchaser information storage 12 by a purchaser when the purchaser acquires a point card, for example, in this embodiment, the annual income, hobby and the like included in the purchaser information, for example, may be estimated based on a purchase log including a card ID included in the purchaser information and registered in the purchaser information storage 12 automatically.

Specifically, it can be estimated that the annual income of a purchaser is relatively high when products identified by product IDs included in purchase logs in association with the same card ID (i.e., products purchased by a purchaser who owes a point card identified by the card ID) include many products having relatively high prices, or it can be estimated that the annual income of a purchaser is relatively low when the products include many products having relatively low prices, for example. It is to be noted that (information indicating) the price or each product may be preliminarily prepared in the data connection device 10, or may be acquired from an external server device.

Moreover, it can be estimated that the hobby of a purchaser is gardening when products identified by product IDs included in purchase logs in association with the same card ID include many products to be used for gardening, or it can be estimated that the hobby of a purchaser is sports when the products include many products to be used for sports, for example. It is to be noted that (information indicating) the use of each product may be preliminarily prepared in the data connection device 10, or may be acquired from an external server device.

Figure 4:
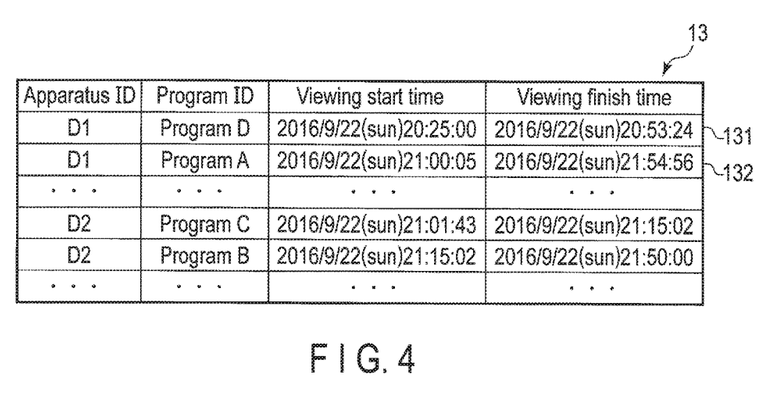
FIG. 4 is a view illustrating an example of the data structure of a viewing log stored in a viewing log storage.

FIG. 4 illustrates an example of the data structure of a viewing log stored in the viewing log storage 13 illustrated in FIG. 1. As illustrated in FIG. 4, a viewing log stored in the viewing log storage 13 includes a program ID, a viewing start time and a viewing finish time in association with an apparatus ID.

An apparatus ID is identification information to be used for identifying a viewing apparatus from which a viewing log including the apparatus ID has been collected.

A program ID is identification information to be used for identifying a program which has been viewed at a viewing apparatus identified by an apparatus ID associated with the program ID.

A viewing start time indicates the date and time or the like when viewing of a program identified by a program ID was started at a viewing apparatus identified by an apparatus ID associated with the viewing start time.

A viewing finish time indicates the date and time or the like when viewing of a program identified by a program ID was finished at a viewing apparatus identified by an apparatus ID associated with the viewing finish time.

In the example illustrated in FIG. 4, a plurality of viewing logs including viewing logs 131 and 132 are illustrated as viewing logs collected from a viewing apparatus identified by an apparatus ID "D1", for example. It is to be noted that a viewing log collected from a viewing apparatus identified by an apparatus ID "D1" includes the apparatus ID "D1".

Specifically, the viewing log 131 includes a program ID "Program D", a viewing start time "2016/9/22 (sun) 20:25:00" and a viewing finish tame "2016/9/22 (sun) 20:53:24" in association with an apparatus ID "D1". This viewing log 131 indicates that a program identified by a program ID "Program D" was viewed at a viewing apparatus identified by an apparatus ID "D1" from 20:25:00 in Sep. 22 (Sunday), 2016, to 20:53:24 in Sep. 22 (Sunday), 2016.

Moreover, the viewing log 132 includes a program ID "Program A", a viewing start time "2016/9/22 (sun) 21:00:05" and a viewing finish time "2016/9/22 (sun) 21:54:56" in association with an apparatus ID "D1". This viewing log 132 indicates that a program identified by a program ID "Program A" was viewed at a viewing apparatus identified by an apparatus ID "D1" from 21:00:05 in Sep. 22 (Sunday), 2016, to 21:54:56 in Sep. 22 (Sunday), 2016.

Although detailed description is omitted here, all viewing logs collected from a viewing apparatus identified by an apparatus ID "D1" are stored in the viewing log storage 13 in addition to the viewing logs 131 and 132.

Moreover, a plurality of viewing logs including an apparatus ID "D2" are stored in the viewing log storage 13 as viewing logs collected from a viewing apparatus identified by an apparatus ID "D2", for example, in the example illustrated in FIG. 4.

It is to be noted that (the data structure of) a viewing log collected from a viewing apparatus identified by an apparatus ID "D2" is like a viewing log (e.g., the viewing logs 131 and 132) collected from a viewing apparatus identified by the apparatus ID "D1", and therefore detailed description thereof is omitted herein.

Although only viewing logs collected from viewing apparatuses identified by apparatus IDs "D1" and "D2" are illustrated in FIG. 4, the viewing log storage 13 also store viewing logs collected from other viewing apparatuses.

It is to be assumed that a viewing log in this embodiment represents one time of viewing behavior. Viewing behavior represented by one viewing log starts when the channel is changed or the viewing apparatus is powered ON, and finishes when the channel is changed or the viewing apparatus is powered OFF, for example.

Figure 5:
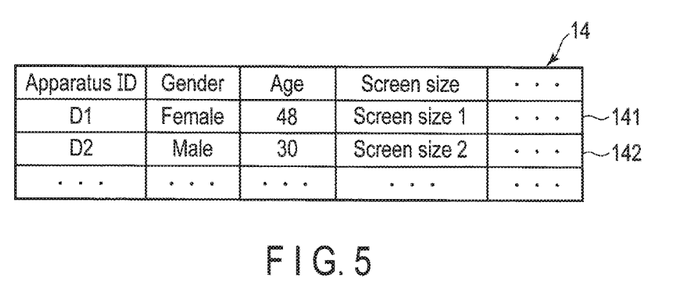
FIG. 5 is a view illustrating an example of the data structure of viewer information stored in a viewer information storage.

FIG. 5 illustrates an example of the data structure of viewer information stored in the viewer information storage 14 illustrated in FIG. 1. Viewer information stored in the viewer information storage 14 includes a plurality or types or attribute information such as gender, age and a screen size, for example, in association with an apparatus ID.

An apparatus ID is identification information to be used for identifying a viewing apparatus which is used by a viewer for viewing a program. Gender indicates the gender of a viewer who views a program at a viewing apparatus identified by an apparatus ID associated with the gender. Age indicates the age of a viewer who views a program at a viewing apparatus identified by an apparatus ID associated with the age.

A screen size indicates the screen size of a viewing apparatus identified by an apparatus ID associated with the screen size.

In the example illustrated in FIG. 5, the viewer information storage 14 stores a plurality of pieces of viewer information including viewer information 141 and 142.

Specifically, the viewer information 141 includes gender "Male", age "48" and a screen size "Screen. Size 1" in association with an apparatus ID "D1". This viewer information 141 indicates that the gender of a viewer who views a program at a viewing apparatus identified by an apparatus ID "D1" is male, the age of the viewer is 48 years old, and the screen size of the viewing apparatus is Screen Size 1.

Moreover, the viewer information 142 includes gender "Female", age "30" and a screen size "Screen Size 2" in association with an apparatus ID "D2". This viewer information 142 indicates that the gender of a viewer who views a program at a viewing apparatus identified by an apparatus ID "D2" is female, the age of the viewer is 30 years old, and the screen size of the viewing apparatus is Screen Size 2.

Although detailed description is omitted here, the viewer information storage 14 also stores viewer information relating to viewers other than viewers relating to the viewer information 141 and 142.

Although (gender, age, a screen size and the like included in) viewer information is registered in the viewer information storage 14 by a viewer when the viewer starts using a viewing apparatus, for example, this embodiment, a screen size, for example, included in the viewer information may be registered in the viewer information storage 14 automatically based on the product number or the like of the viewing apparatus.

Although the above description has explained a case where viewer information includes gender, age and a screen size as attribute information, the viewer information may include attribute information such as the family structure or a region, for example.

It is to be noted that a family structure included in viewer information may be estimated based on a viewing log including an apparatus ID included in the viewer information and registered in the viewer information storage 14 automatically, for example. Specifically, it can be estimated that a viewer who uses a viewing apparatus has a family structure including a little child when programs identified by program IDs included in viewing logs in association with the same apparatus ID (i.e., programs viewed at a viewing apparatus identified by the apparatus ID) include relatively many programs for children, for example. It is to be noted that information indicating whether each program is a program for children or not may be preliminarily prepared in the data connection device 10, or may be acquired from an external server device.

Moreover, a region included in viewer information may be registered in the viewer information storage 14 automatically based on information such as a postal code or an area code which is registered when a viewer starts using a viewing apparatus, for example.

Figure 6:
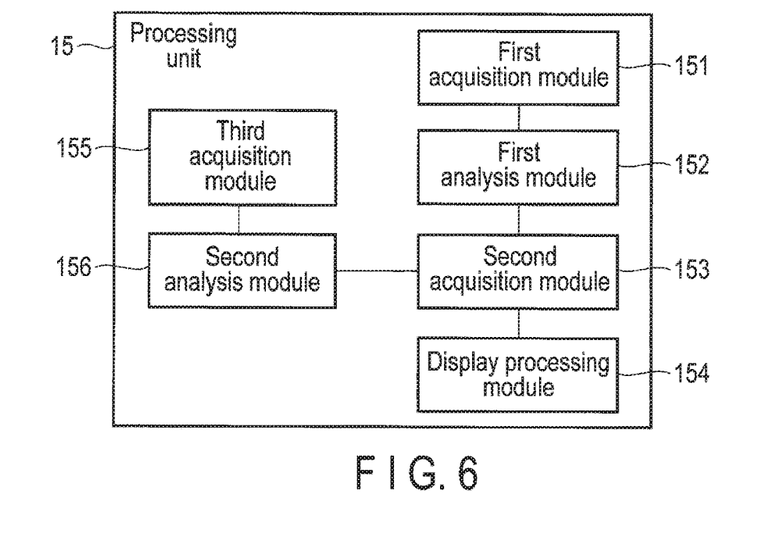
FIG. 6 is a block diagram illustrating an example of the functional configuration of a processor.

FIG. 6 is a block diagram illustrating an example of the functional configuration of the processing unit 15 illustrated in FIG. 1. As illustrated in FIG. 6, the processing unit 15 includes a first acquisition module 151, a first analysis module 152, a second acquisition module 153, a display processing module 154, a third acquisition module 155 and a second analysis module 156.

In this embodiment, it is to be assumed that the whole or a part of these modules 151 to 156 is implemented by causing a computer (a processor) described above to execute a program, that is, implemented by software, for example. It is to be noted that the whole or a part of these modules 151 to 156 may be implemented by hardware such as IC (Integrated Circuit), or may be implemented as a combination structure of software and hardware, for example. It is to be noted that a program to be executed by a computer may be stored in a computer-readable storage medium and distributed, or may be downloaded to the data connection device 10 through a network.

The first acquisition module 151 acquires a set of purchase logs (which will be hereinafter written as a purchase log set), which indicate behavior of purchasing a specific product, out of a plurality or purchase logs stored in the purchase log storage 11. This purchase log set acquired by the first acquisition module 151 makes it possible to specify a set of (card IDs used for identifying point cards owed by) purchasers who have purchased a specific product.

The first analysis module 152 analyzes (attribute information included in) purchaser information stored in the purchaser information storage 12 so as to extract a common feature of a purchase log set (a set of purchasers who have purchased a specific product) acquired by the first acquisition module 151.

The second acquisition module 153 acquires a set of viewing logs (which will be hereinafter written as a viewing log set), which have a feature common with a purchase log set acquired by the first acquisition module 151, from the viewing log storage 13 based on (attribute information included in) viewer information stored in the viewer information storage 14 and a feature extracted by the first analysis module 152.

In this embodiment, a purchase log set acquired by the first acquisition module 151 and a viewing log set acquired by the second acquisition module 153 can be connected with each other.

The display processing module 154 executes processing of displaying a viewing log set which has been connected with the purchase log set as described above.

Here, since a common ID or the like is not used for the purchase log and the viewing log, it is impossible to specify a purchase log and a viewing log relating to the same user, for example. On the contrary, a purchase log, purchaser information, a viewing log and viewer information (i.e., already connected information) relating to the same user (specific users) collected as samples to be used for connecting the purchase log set and the viewing log set with high accuracy may be preliminarily prepared in this embodiment.

The third acquisition module 155 acquires a purchase log, purchaser information, a viewing log and viewer information (which will be hereinafter written as correspondence information) relating to the same user. It is to be noted that the third acquisition module 155 may acquire correspondence information preliminarily stored in the data connection device 10, or may acquire (receive) correspondence information from a server device or the like outside the data connection device 10, for example.

The second analysis module 156 analyzes correspondence information so as to extract a relation of a feature between purchaser information and viewer information.

A relation extracted by the second analysis module 156 is utilized when the second acquisition module 153 acquire a viewing log set, for example.

Next, an example of the process procedures of the data connection device 10 according to this embodiment will be described referring to the flowchart of FIG. 7. The process procedures of the data connection device 10 of a case where the correspondence information is not utilized will be described first. It is to be noted that the processing illustrated in FIG. 7 is executed by the processing unit 15 included in the data connection device 10.

Figure 7:
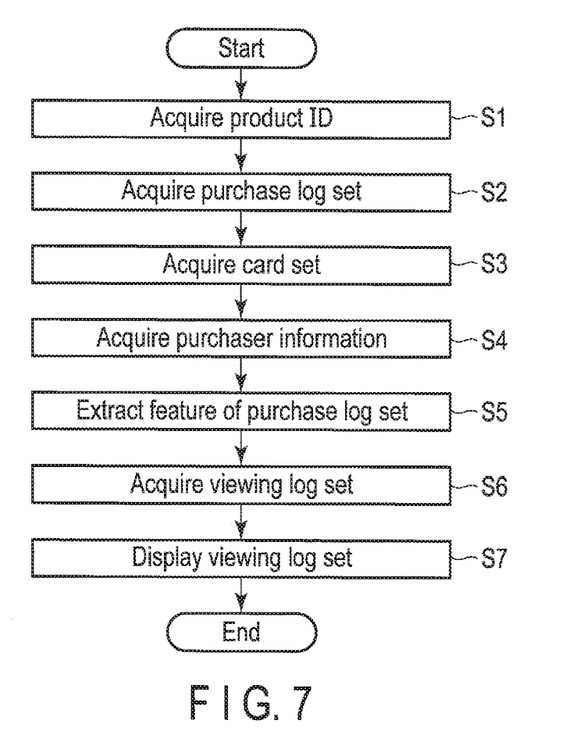
FIG. 7 is a flowchart illustrating an example of the process procedures of a data connection device.

In this embodiment, a purchase log indicating behavior of purchasing a product by a purchaser (a first log indicating first behavior of a user) and a viewing log indicating behavior of viewing a program at a viewing apparatus by a viewer (a second log indicating second behavior of a user) are connected with each other by execution of the processing illustrated in FIG. 7.

First, the first acquisition module 151 acquires a product ID to be used for identifying a specific product (step S1). The specific product in step S1 may be a product designated by an analyst, or may be a product automatically selected from a plurality of products purchased by a purchaser, for example.

Next, the first acquisition module 151 acquires a set of purchase logs (a purchase log set) indicating behavior of purchasing a product identified by the product ID acquired in step S1 from the purchase log storage 11 (step S2). In such a case, the first acquisition module 151 acquires a plurality of purchase logs including the product ID acquired in step S1 as a purchase log set.

When the processing of step S2 is executed, the first acquisition module 151 acquires a plurality of card IDs each included in the purchase log set (a plurality of purchase logs) as a card set (step S3). Since a card ID is identification information to be used for identifying a point card owed by a purchaser, it is to be noted that the card set acquired in step S3 corresponds to a set of purchasers who owe point cards identified by card IDs included in the card set (i.e., purchasers who have purchased a product identified by the product ID acquired in step S1).

The first analysis module 152 acquires (a set of) purchaser information relating to purchasers, who owe point cards respectively identified by a plurality of card IDs included in the card set acquired in step S3, from the purchaser information storage 12 (step S4). Specifically, the first analysis module 152 acquires a plurality of pieces of purchaser information respectively including cards IDs included in the card set acquired in step S3.

The first analysis module 152 analyzes a plurality of pieces of the purchaser information acquired in step S4 so as to extract a feature (tendency) of the purchase log set acquired in step S2 (a set of purchasers who have purchased a product identified by the product ID acquired in step S1) (step S5). In step S5, a feature relating to attribute information common to purchaser information and viewer information, for example, is extracted as a feature of a purchase log set. In this embodiment, it is assumed that a feature represented by, gender, age and the like, for example, is extracted as attribute information common to purchaser information and viewer information. It is to be noted that a feature of a purchase log set may be extracted by statistics or the like of all the purchaser information acquired in step S4, for example, or may be extracted based on purchaser information belonging to a cluster, to which the largest number of purchasers (purchaser information) have been classified in clustering using K-means or the like, for example, out of a plurality of pieces of the purchaser information acquired in the step S4.

Although this embodiment has been described as a case where the first analysis module 152 extracts one feature, it is to be noted that the first analysis module 152 may extract a plurality of features. Specifically, a plurality of features may be extracted based on purchaser information respectively belonging to a plurality of clusters to which a threshold or larger number of purchasers (purchaser information) have been classified in the clustering, for example. When the first analysis module 152 extracts plurality of features, the processing of steps S6 and S7, which will be described hereinafter, may be executed to each of the features.

The second acquisition module 153 acquires a set of viewing logs (a viewing log set) having a feature common with a feature extracted by the first analysis module 152 (a feature of a purchase log set), based on (attribute information included in) viewer information stored in the viewer information storage 14 (step S6).

In step S6, the second acquisition module 153 specifies viewer information including attribute information (e.g., gender, age and the like) similar to a feature extracted by the first analysis module 152, for example, and acquires a plurality or apparatus IDs, which are each included in the specified viewer information, as a viewing apparatus set. Since an apparatus ID is identification information to be used for identifying a viewing apparatus at which a viewer views a program, it is to be noted that a viewing apparatus set acquired by the second acquisition module 153 corresponds to a set of viewers who view a program at a viewing apparatus identified by an apparatus ID acquired as the viewing apparatus set.

Next, the second acquisition module 153 acquires a plurality of viewing logs, which respectively include apparatus IDs included in the acquired viewing apparatus set, as a viewing log set.

In this embodiment, the viewing log set (or a set of viewers) acquired in step S6 is connected with the purchase log set (or a set of purchasers) acquired in step S2. That is, the viewing log set acquired in step S6 can be regarded as a set of viewing logs indicating history of viewing of a program by (viewers corresponding to) purchasers who have purchased a product identified by the product ID acquired in step S1.

The display processing module 154 displays the viewing log set acquired in step S6 (step S7). In such a case, the display processing module 154 analyzes the viewing log set acquired in step S6 (that is, executes processing for connecting a purchase log set and a viewing log set with each other) so as to display (an analysis result of) the viewing log set. It is to be noted that a display example of a viewing log set by the display processing module 154 will be described later.

The following description will explain a concrete example of connecting a purchase log and a viewing log with each other in this embodiment.

First, it is assumed that the first acquisition module 151 acquires a product ID to be used for identifying shampoo A, for example, as a specific product. In such a case, the first acquisition module 151 acquires a set of purchase logs indicating behavior of purchasing the shampoo A (which will be hereinafter written as a purchase log set of the shampoo A). Each of purchase logs included in the purchase log set of the shampoo A acquired here includes a product ID to be used for identifying the shampoo A, and a card ID to be used for identifying a point card owed by a purchaser who has purchased the shampoo A.

Next, the first acquisition module 151 acquires a plurality of card IDs (a card set) each included in the purchase log set (a plurality of purchase logs) of the shampoo A. A card set acquired here corresponds to a set of purchasers who have purchased the shampoo A.

The first analysis module 152 acquires (a set of) purchaser information each including a card ID included in a card set acquired by the first acquisition module 151. The first analysis module 152 analyzes the acquired purchaser information so as to extract a feature of a purchase log set of the shampoo A (a set of purchasers who have purchased the shampoo A). In such a case, the first analysis module 152 can extract a feature that a set of purchasers who have purchased the shampoo A includes many female purchasers in their thirties, for example.

Next, the second acquisition module 153 acquires a viewing log set having a feature common with the feature extracted by the first analysis module 152.

Here, when it is assumed that the first analysis module 152 extracts a feature that there are many female purchasers in their thirties, for example, as described above, the second acquisition module 153 specifies viewer information having age of thirties and gender of female, and acquires (a set of) a plurality of apparatus IDs each included in the specified viewer information as a viewing apparatus set.

The second acquisition module 153 acquires a set of viewing logs (a viewing log set) respectively including the apparatus IDs acquired as a viewing apparatus set.

A viewing log set acquired by the second acquisition module 153 in such a manner is a set of viewing logs indicating behavior of viewing a program by a viewer corresponding to a purchaser who has purchased the shampoo A (which will be hereinafter written as a viewing log set of purchasers of the shampoo A). That is, a viewing log set of purchasers of the shampoo A is acquired by estimating viewers corresponding to purchasers using a condition of a feature (e.g., gender, age and the like) of a set of purchasers who have purchased the shampoo A (purchaser information) in this embodiment.

In this embodiment, information on viewing habits or the like of (viewers corresponding to) purchasers who have purchased the shampoo A (i.e., information which cannot be obtained from only purchase logs), for example, can be obtained by analyzing such a viewing log set.

From a viewing start time and a viewing finish time included in a viewing log as described above, for example, information on a time zone in which a viewer viewed a program (a time zone from the viewing start time to the viewing finish time) can be obtained. This makes it possible to estimate a time zone (viewing habits) in which a purchaser who has purchased the shampoo A views a program by analyzing a viewing log set of purchasers of the shampoo A, and therefore advertising effectiveness can be improved by developing advertisement or the like of the shampoo A or a product related to the shampoo A based on a time zone in which purchasers of the shampoo A view a program.

Moreover, it is assumed that it is possible to obtain information on a category or the like of a program identified by a program ID from the program ID included in a viewing log. In such a case, it can be estimated that a viewing log set has viewing habits of often viewing programs belonging to a specific category when it is estimated from analysis of a viewing log set that programs belonging to the specific category are often viewed, for example.

This can improve advertising effectiveness by developing advertisement or the like of shampoo A based on the viewing habits when it is estimated that purchasers who have purchased the shampoo A have viewing habits of often viewing programs belonging to a category of drama, for example.

It is to be noted that it is also possible not to specify a category but to specify a program, which is viewed by many of purchasers who have purchased shampoo A (that is, estimate that many of purchasers who have purchased shampoo A have viewing habits of viewing a specific program), for example, by analyzing a viewing log set.

Here, although the processing illustrated in FIG. 7 has been described as a case where a viewing log set is acquired based on a feature of a purchase log set (a feature of attribute information common to purchaser information and viewer information), connection precision between a purchase log set and a viewing log set sometimes becomes low depending on a feature of gender and age, for example.

Accordingly, it is also possible to connect a purchase log set and a viewing log set with each other by utilizing the correspondence information in this embodiment. The following description will explain an example of process procedures of the data connection device 10 of a case where correspondence information is utilized, referring to the flowchart of FIG. 8.

Figure 8:
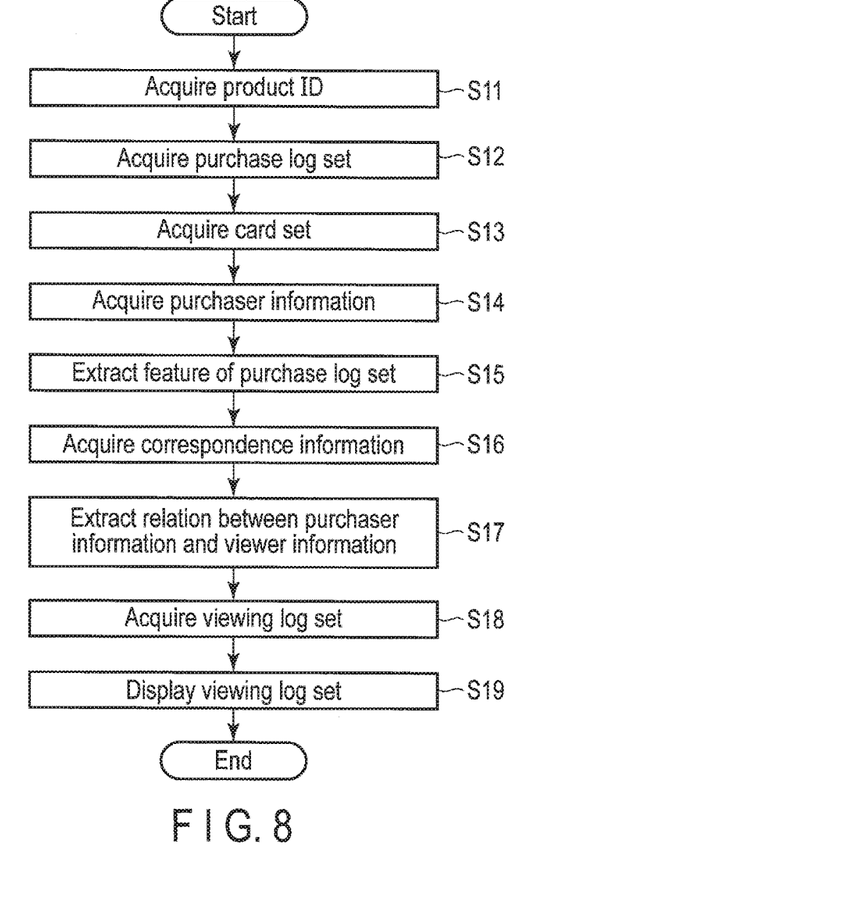
FIG. 8 is a flowchart illustrating an example of the process procedures of a data connection device of a case where correspondence information is utilized.

First, processing of steps S11 to S15 corresponding to the processing of steps S1 to S5 illustrated in FIG. 7 described above is executed.

Next, the third acquisition module 155 acquires a purchase log, purchaser information, a viewing log and viewer information relating to the same user as correspondence information (step S16). In such a case, a purchaser (a user) who owes a point card identified by a card ID included in a purchase log and purchaser information acquired as correspondence information is identical with a viewer (a user) who views a program at a viewing apparatus identified by an apparatus ID included in a viewing log and viewer information acquired as correspondence information. That is, correspondence information is information wherein a purchase log (and purchaser information) and a viewing log (and viewer information) are already connected (associated) with each other.

It is to be assumed that the third acquisition module 155 acquires correspondence information relating to each of a plurality of users collected as samples.

The second analysis module 156 executes correlation analysis processing or the like, for example, to the correspondence information (a purchase log, purchaser information, a viewing log and viewer information) acquired by the third acquisition module 155 so as to extract a relation between attribute information (a feature) included in purchaser information and attribute information (a feature) included in viewer information (which will be hereinafter written as a relation between purchaser information and viewer information), for example (step S17).

The second acquisition module 153 utilizes the relation between purchaser information and viewer information extracted in step S17 so as to acquire a set of viewing logs (a viewing log set) indicating behavior of viewing a program by a purchaser who has purchased a product identified by the product ID acquired in step S11 (step S18). In such a case, the second acquisition module 153 acquires viewer information corresponding to the feature extracted in step S5 (attribute information included in purchaser information) from the relation extracted in step S17, and acquires a set of viewing logs including an apparatus ID included in the viewer information.

In order to give detailed description on the processing, of steps S17 and S18, assume a case where a feature that purchasers who have purchased shampoo A include many females in their thirties having relatively low annual income and hobby of gardening has been extracted in step S15. It is to be noted that this feature is extracted based on each attribute information included in the purchaser information illustrated in FIG. 3.

Moreover, it is to be assumed that a relation that a purchaser having relatively low annual income and hobby of gardening has a viewing apparatus with a small screen size is extracted in step S17 as a relation between attribute information included in purchaser information and attribute information included in viewer information.

This makes it possible to acquire viewer information having age of thirties, gender of female and a small screen size, for example, as viewer information corresponding to purchaser information from which a feature that there are many females in their thirties having relatively low annual income and hobby of gardening has been extracted, and acquire a viewing log set based on the viewer information in step S18. In such a case, (a set of) a plurality of apparatus IDs each included in such viewer information can be acquired as viewing apparatus set, and a viewing log set including each of apparatus Its acquired as the viewing apparatus set can be acquired.

When the processing of step S18 is executed, processing of step S19 corresponding to the processing of step S7 illustrated in FIG. 7 is executed.

Here, the display processing module 154 displays a viewing log set connected with a purchase log set (i.e., a viewing log set acquired by the second acquisition module 153) as described above.

Figure 9:
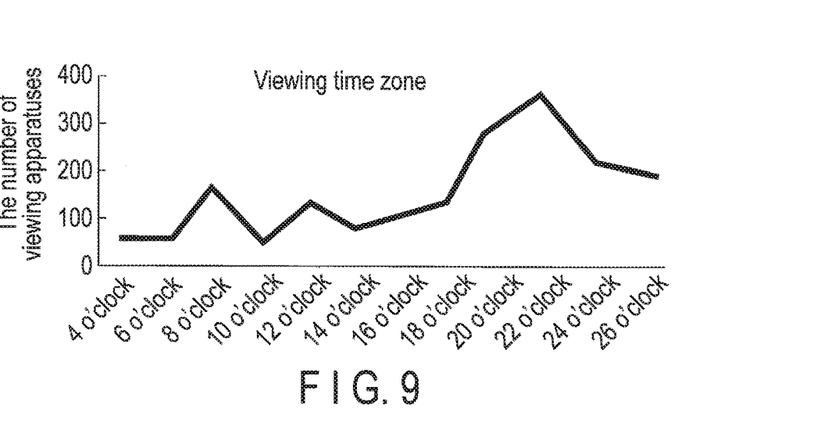
FIG. 9 is a view illustrating a display example of a viewing log set.

In such a case, the display processing module 154 can display a graph such as the one illustrated in FIG. 9, for example. In the graph illustrated in FIG. 9, the ordinate represents the number of viewing apparatuses in a viewing log set, and the abscissa represents a time zone (a viewing time zone).

The display processing module 154 can display the graph illustrated in FIG. 9 by analyzing a viewing log set and accumulating the number of (apparatus IDs included in) viewing logs including a viewing start time and a viewing finish time which fall within the time zone for each time zone. Such a graph can show accumulation of (viewers who were viewing programs at) viewing apparatuses in each time zone.

In a case of a viewing log set of purchasers of the shampoo A, the graph illustrated in FIG. 9 shows that (viewers corresponding to) purchasers who have purchased the shampoo A tend to view a program mainly in a time zone from 20 o'clock to 24 o'clock (that is, a viewing time zone is a time zone from 20 o'clock to 24 o'clock), for example.

Figure 10:
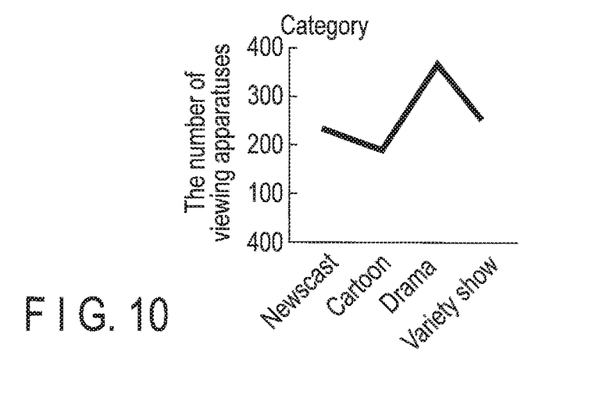
FIG. 10 is a view illustrating another display example of a viewing log set.

Moreover, the display processing module 154 can also display a graph such as the one illustrated in FIG. 10, for example. In the graph illustrated in FIG. 10, the ordinate represents the number of viewing apparatuses in a viewing log set, and the abscissa represents a category.

The display processing module 154 analyzes a viewing log set so as to specify a category of a program which tends to be viewed for each viewing apparatus (i.e., a category in which a viewer who views a program at the viewing apparatus is interested), and accumulates the number of viewing apparatuses for each category so as to display the graph illustrated in FIG. 10. Such a graph can show accumulation of (viewing apparatuses which are used to view programs by) purchasers who are interested in each category.

It is to be noted that one category which is viewed most often at a viewing apparatus may be specified as a category of a program which tends to be viewed at the viewing apparatus (i.e., a category in which a viewer is interested), for example, or two or more categories which are viewed for preset or longer time at a viewing apparatus may be specified as categories which tend to be viewed at the viewing apparatus, for example.

In a case of a viewing log set of purchasers of the shampoo A, the graph illustrated in FIG. 10 shows that (viewers corresponding to) purchasers who have purchased the shampoo A tend to mainly view (programs belonging to a category of) drama.

Moreover, the display processing module 154 can also display a graph wherein the abscissa represents attribute information included in viewer information.

Figure 11:
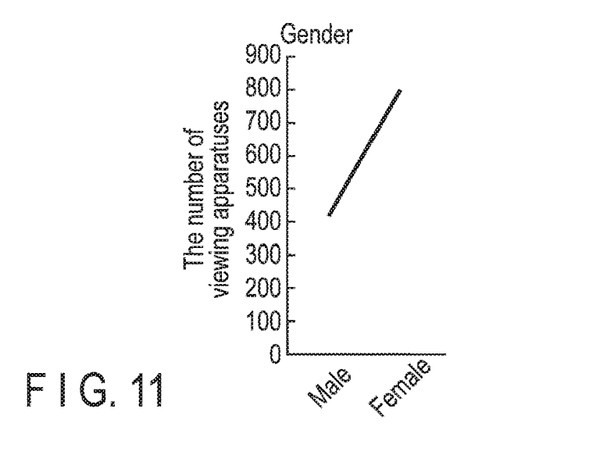
FIG. 11 is a view illustrating yet another display example of a viewing log set.

FIG. 11 illustrates an example of a graph wherein the ordinate represents the number of viewing apparatuses in a viewing log set, and the abscissa represents gender. The display processing module 154 can display the graph illustrated in FIG. 11 by accumulating gender included in viewer information including apparatus IDs which are each included in a viewing log set (a plurality of viewing logs). Such a graph can show accumulation of genders of viewers who view programs at viewing apparatuses respectively identified by apparatus IDs each included in a viewing log set.

In a case of a viewing log set of purchasers of the shampoo A, the graph illustrated in FIG. 11 shows that (viewers corresponding to) purchasers who have purchased the shampoo A tend to include more females than males.

Figure 12:
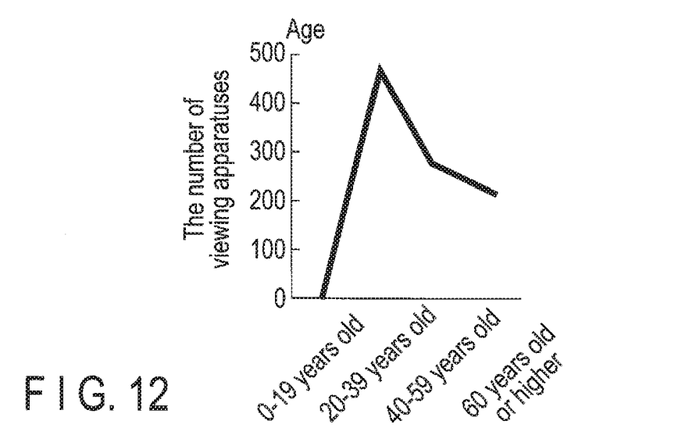
FIG. 12 is a view illustrating yet another display example of a viewing log set.

FIG. 12 illustrates an example of a graph wherein the ordinate represents the number of viewing apparatuses in a viewing log set and the abscissa represents age. The display processing module 154 can display the graph illustrated in FIG. 12 by accumulating ages (e.g., groups of 0-19 years old, 20-39 years old, 40-59 years old, and 60 years old or higher) included in viewer information which includes apparatus IDs each included in a viewing log set (a plurality of viewing logs). Such a graph can show accumulation of ages of viewers who view programs at viewing apparatuses respectively identified by apparatus IDs each included in a viewing log set.

In a case of a viewing log set of purchasers of the shampoo A, the graph illustrated in FIG. 12 shows that (viewers corresponding to) purchasers who have purchased the shampoo A include many people of 20-39 years old.

It is to be noted that the graphs illustrated in FIGS. 9 to 12 may not be displayed individually but may be displayed side by side, for example. When the graphs illustrated in FIGS. 9 to 12 are displayed side by side, for example, it can be easily grasped that (a group of) purchasers who have purchased the shampoo A are females of 20-39 years old who often view drama in a viewing time of a time zone from 20 o'clock to 24 o'clock.

In such a case, it can be expected that high effectiveness relating to an advertisement can be obtained by inserting the advertisement (such as TV commercial) of the shampoo A and a product related to the shampoo A before, after or in the middle of (a program belonging to a category of) drama broadcasted in time zone from 20 o'clock to 24 o'clock. Moreover, it is estimated that further high effectiveness can be obtained by selecting drama, which is estimated to be viewed by females of 20-39 years old, for example, as drama into which the advertisement is to be inserted, out of dramas which are broadcasted in a time zone from 20 o'clock to 24 o'clock, for example.

It is to be noted that a graph, which is designated by an analyst or the like, for example, out of the graphs illustrated in FIGS. 9 to 12 may be displayed. That as, this embodiment may be configured so that an analyst can suitably select (filtering) the subject of accumulation (the subject of display), for example.

Although a viewing log set is displayed as polygonal line graphs as illustrated in FIGS. 9 to 12, the viewing log set may be displayed in a different manner such as a table, a circle graph or a bar graph, for example.

Although the above description has explained a case where a viewing log set of purchasers of shampoo A is displayed, a set of viewing logs excluding the viewing log set (i.e., a set of viewing logs indicating behavior of viewing programs by viewers other than viewers corresponding to purchasers who have purchased shampoo A) may be further displayed, for example. This makes it possible to further clearly grasp a feature of a viewing log set indicating behavior of viewing programs by viewers corresponding to purchasers who have purchased shampoo A.

Furthermore, a purchase log set connected with a viewing log set (a purchase log set acquired by the first acquisition module 151) can also be displayed as with a viewing log set. In such a case, it is possible to compare a purchase log set and a viewing log set with each other by displaying the purchase log set and the viewing log set connected with the purchase log set in association with each other. Moreover, a log set selected from a purchase log set and a viewing log set may be displayed.

In this embodiment, a purchase log set, which indicates behavior of purchasing a specific product, for example, out of a plurality of purchase logs indicating behavior of purchasing a product by a purchaser (a plurality of first logs indicating first behavior) is acquired, and a viewing log set having a feature common with the purchase log set is acquired as described above. It is to be noted that a viewing log set is a set of viewing logs indicating behavior of viewing a program by a viewer (second logs indicating second behavior).

In such a case, purchaser information (first attribute information) relating to purchasers who have purchased a specific product is acquired based on a purchase log set and the acquired purchaser information is analyzed, so that viewer information having a feature common with the purchaser information is acquired and a viewing log set indicating behavior of viewing a program by a viewer relating to the acquired viewer information is acquired.

In this embodiment, such a structure makes it possible to connect a plurality of independent logs (first and second logs) with each other and utilize the same. That is, it is possible in this embodiment to estimate viewing habits (a time zone, a category and the like) of viewing programs by viewers corresponding to purchasers who have purchased a specific product in a purchase log set, for example, by connecting a purchase log set and a viewing log set with each other, and therefore information which cannot be obtained from each of a purchase log (set) and a viewing log (set), for example, (e.g., viewing habits of a purchaser) can be obtained, and it becomes possible to utilize the information for development of advertisement of a product or the like, for example.

In this embodiment, a relation of a feature between purchaser information (and a purchase log) and viewer information (and a viewing log) is also extracted based on the already connected purchase log, purchaser information, viewing log and viewer information (correspondence information), and a viewing log set is acquired utilizing the extracted relation. Here, assume a case where a purchase log set indicating behavior of purchasing a shampoo A by a purchaser is acquired, for example. In such a case, it becomes possible to acquire a viewing log set of viewers who are more likely to correspond to purchasers of the shampoo A in comparison with a case where (a relation of a feature extracted based on) correspondence information is not utilized, and therefore it becomes possible to improve the connection precision between a purchase log set and a viewing log set.

It is also possible in this embodiment to display (an analysis result of) a viewing log set as illustrated in FIGS. 9 to 12, and therefore an analyst can easily grasp viewing habits (an analysis result of a viewing log set) of purchasers of a specific product (e.g., shampoo A) or the like, for example.

Although this embodiment has been described to be configured so that a viewing log set connected with a purchase log set is acquired, a program ID to be used for identifying a specific program may be inputted and a purchase log set connected with a viewing log set including the program ID may be acquired, for example. A purchase log set acquired in such a case (i.e., a purchase log set connected with a viewing log set) is a set of purchase logs indicating behavior of purchasing a product by purchasers corresponding to viewers who have viewed a specific program.

Although a case where a purchase log (set) and a viewing log (set) are connected with each other has been mainly described here in this embodiment, this embodiment can be applied to any case where a plurality of independent logs are connected with each other. The following description will explain an example wherein a plurality of independent logs other than a purchase log and a viewing log described in this embodiment are connected with each other.

An example of connecting two independent purchase logs with each other will be described first. Here, the data connection device 10 includes a first purchase log storage configured to store a first purchase log indicating behavior of purchasing a product by a first purchaser who owes a first point card, and a first purchaser information storage configured to store information relating to the first purchaser (which will be hereinafter written as first purchaser information), for example. The data connection device 10 also includes a second purchase log storage configured to store a second purchase log indicating behavior of purchasing a product by a second purchaser who owes a second point card different from the first point card, and a second purchaser information storage configured to store information relating to the second purchaser (which will be hereinafter written as second purchaser information). That is, the first purchase log storage, the first purchaser information storage, the second purchase log storage and the second purchaser information storage respectively correspond to the purchase log storage 11, the purchaser information storage 12, the viewing log storage 13 and the viewer information storage 14 described in this embodiment.

In such a case, the data connection device 10 according to this embodiment can acquire a second purchase log set indicating behavior of purchasing a product by a second purchaser corresponding to a first purchaser who owes a first point card with which a specific product has been purchased, for example, based on the first purchase log, the first purchaser information, the second purchase log and the second purchaser information. Specifically, a second purchase log set can be acquired by estimating a second purchaser corresponding to a first purchaser using a condition of a feature (e.g., gender, age and the like) of the first purchaser (first purchaser information) who has purchased a specific product. It is to be noted that the processing of acquiring a second purchase log set is like the processing illustrated in FIGS. 7 and 8, and therefore detailed description thereof is omitted herein.

This makes it possible to obtain information on a product or the like which a purchaser who has purchased a product by representing a first point card has purchased by representing a second point card, for example, by analyzing the second purchase log set.

That is, although only information relating to a purchaser who has purchased a first product at a first store can be obtained from a first purchase log set, information relating to whether a purchaser who has purchased a first product at a first store has purchased a second product at a second store or not can also be obtained by connecting the first purchase log set and the second purchase log set with each other, for example.

An example of connecting a browsing log of a website or the like and a viewing log will be described next. Here, the data connection device 10 includes a browsing log storage configured to store a browsing log indicating behavior of browsing a website by a user who browses a website (which will be hereinafter written as a browser) utilizing the Internet, for example, and a browser information storage configured to store information relating to the browser (which will be hereinafter written as browser information). The data connection device 10 also includes the viewing log storage 13 and the viewer information storage 14. That is, the browsing log storage and the browser information storage respectively correspond to the purchase log storage 11 and the purchaser information storage 12 described in this embodiment.

In such a case, the data connection device 10 according to this embodiment makes it possible to acquire a viewing log set, which indicates behavior of viewing a program by a viewer corresponding to a browser who has browsed a specific website, for example, based on the browsing log, the browser information, the viewing log and the viewer information. Specifically, it is possible to acquire a viewing log set by estimating a viewer corresponding to a browser using a condition of a feature (e.g., a category of a browsed website, age and gender of a browser, and the like) of a browser (browser information) who has browsed a specific website, for example. It is to be noted that the processing of acquiring a viewing log set is like the processing illustrated in FIGS. 7 and 8, and therefore detailed description thereof is omitted herein.

This makes it possible to obtain information on a program or the like, which has been viewed at a viewing apparatus by a browser who has browsed a specific website, for example, by analyzing such a viewing log set.

That is, although only information on browsers who have browsed a website "a" can be obtained from a browsing log set, for example, information on whether a browser who has browsed a website "a" views a program "b" at a viewing apparatus or not can also be obtained by connecting a browsing log set and a viewing log set with each other as described above.

It is to be noted that the category of a website used for connecting a browsing log set and a viewing log set with each other may be preliminarily prepared in association with the website, or may be estimated from a keyword in the website (page), for example. Moreover, the gender, age and the like of a browser included in browser information can be similarly estimated from the content (tendency) of a website which the browser has browsed.

As described above, it becomes possible in this embodiment to obtain useful information which cannot be obtained from each of a plurality of independent logs by connecting the logs with each other.

While certain embodiments nave been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data connection device comprising:
a memory;
a first log storage in the memory and configured to store a plurality of first logs indicating a first behavior of a first user;
a second log storage in the memory and configured to store a plurality of second logs, wherein the plurality of second logs are independent of the plurality of first logs and indicate a second behavior of a second user;
a first attribute information storage in the memory and configured to store first attribute information relating to the first user who has performed the first behavior;
a second attribute information storage in the memory and configured to store second attribute information relating to the second user who has performed the second behavior; and
a processor electrically coupled to the memory, and configured to:

acquire, from the first log storage, a set of first logs indicating a specific first behavior, the set of first logs from the plurality of first logs;
acquire, from the first attribute storage, first attribute information relating to the first user who has performed the specific first behavior based on the set of first logs;
analyze the acquired first attribute information to acquire second attribute information having a feature in common with the first attribute information from the second attribute storage;
acquire, from the second log storage, a set of second logs indicating the second behavior of the second user relating to the acquired second attribute information; and
connect the set of first logs with the set of second logs.

2. The data connection device of claim 1, wherein the processor is further configured to:
extract a relation of a feature between the first attribute information and the second attribute information based on a first log indicating the first behavior of a specific user, a second log indicating the second behavior of the specific user, the first attribute information relating to the specific user, and the second attribute information relating to the specific user;
acquire the second attribute information corresponding to the acquired first attribute information in the relation of a feature between the first attribute information and the second attribute information; and
acquire a set of second logs indicating the second behavior of the second user relating to the acquired second attribute information.

3. The data connection device of claim 1, wherein the processor is further configured to display the set of second logs.

4. The data connection device of claim 1, wherein the second log comprises a viewing log indicating a behavior of viewing a program by the first user at a viewing apparatus displaying a program.

5. The data connection device of claim 4, wherein the first log comprises a purchase log indicating a behavior of purchasing a product by the second user.

6. The data connection device of claim 4, wherein the first log comprises a browsing log indicating a behavior of browsing a website by the first user.

7. A method to be executed by a data connection device which utilizes a first log storage configured to store a plurality of first logs indicating a first behavior of a first user, a second log storage configured to store a plurality of second logs that are independent of the first logs and that indicate second behavior of a second user, a first attribute information storage configured to store first attribute information relating to the first user who has performed the first behavior, and a second attribute information storage configured to store second attribute information relating to the second user who has performed the second behavior, the method comprising:
acquiring, from the first log storage, a set of first logs indicating a specific first behavior, the set of first logs from the plurality of first logs;
acquiring, from the first attribute storage, first attribute information relating to the first user who has performed the specific first behavior based on the set of first logs;
analyze the acquired first attribute information to acquire second attribute information having a feature in common with the first attribute information from the second attribute storage;

acquiring, from the second log storage, a set of second logs indicating the second behavior of the second user relating to the acquired second attribute information; and connecting the set of first logs with the set of second logs.

8. A non-transitory computer-readable storage medium having stored thereon a computer program which is executable by a computer using a first log storage configured to store a plurality of first logs indicating a first behavior of a first user, a second log storage configured to store a plurality of second logs that are independent of the first logs and that indicate second behavior of a second user, first attribute information storage configured to store first attribute information relating to the first user who has performed the first behavior, and a second attribute information storage configured to store second attribute information relating to the second user who has performed the second behavior, the computer program comprising instructions capable of causing the computer to execute functions of:

acquiring, from the first log storage, a set of first logs indicating a specific first behavior, the set of first logs from the plurality of first logs;

acquiring, from the first attribute storage, first attribute information relating to the first user who has performed the specific first behavior based on the set of first logs;

analyze the acquired first attribute information to acquire second attribute information having a feature in common with the first attribute information from the second attribute storage;

acquiring, from the second log storage, a set of second logs indicating the second behavior of the second user relating to the acquired second attribute information; and connecting the set of first logs with the set of second logs.

* * * * *